United States Patent
Choate (10) Patent No.: US 6,887,022 B2
(45) Date of Patent: May 3, 2005

(54) QUICK CONNECT/DISCONNECT FALL ARREST ANCHORAGE

(76) Inventor: Gary E. Choate, 1055 Helland St., Lakewood, CO (US) 80215

( * ) Notice: Subject to any disclaimer, the term of this patent is extended or adjusted under 35 U.S.C. 154(b) by 481 days.

(21) Appl. No.: 09/837,967

(22) Filed: Apr. 18, 2001

(65) Prior Publication Data

US 2002/0021949 A1 Feb. 21, 2002

Related U.S. Application Data

(60) Provisional application No. 60/198,712, filed on Apr. 20, 2000, now abandoned.

(51) Int. Cl.[7] .............................. F16B 19/00; F16B 21/00
(52) U.S. Cl. ........................ 411/348; 411/508; 411/913; 24/453; 403/409.1; 403/DIG. 6
(58) Field of Search .................................. 411/347, 348, 411/508, 509, 510, 913; 24/297, 453; 403/409.1, DIG. 6

(56) References Cited

U.S. PATENT DOCUMENTS

| | | | |
|---|---|---|---|
| 2,399,581 A | * | 4/1946 | Spooner ....................... 24/453 |
| 3,085,462 A | * | 4/1963 | Myers ......................... 24/453 |
| 3,106,416 A | * | 10/1963 | Koontz ........................ 24/453 |
| 4,988,242 A | | 1/1991 | Flux |
| 5,232,302 A | * | 8/1993 | Wagner et al. .......... 411/510 X |

\* cited by examiner

*Primary Examiner*—Neill Wilson
(74) *Attorney, Agent, or Firm*—Ramon L. Pizarro (57) ABSTRACT

A fall arrest anchorage system for use with a female retaining receiver having grooves or side apertures for engaging connector. The system uses an elongated male connector having a first end and a second end that extend along a connector axis, and a first section of a first dimension and a second section of a second dimension. The first dimension is larger than the second dimension, and the first section will be positioned closer to the first end than the second section. The male connector also includes at least one of a first retractable protrusion on the first section and at least one of a second retractable protrusion on the second section, the first retractable protrusion being positioned along the male portion such that the first retractable protrusion will cooperate with the first groove in the receiver when the second retractable protrusion engages the first groove.

7 Claims, 8 Drawing Sheets

WELD ON

CLAMP ON

QUICK CONNECT/DISCONNECT FALL ARREST ANCHORAGE

REFERENCE TO RELATED APPLICATIONS

This application claims the benefit of my provisional application having Ser. No. 60/198,712, filed Apr. 20, 2000, now abandoned.

BACKGROUND OF THE INVENTION

1. Field of the Invention

The present invention relates to a method for quick connection of a fall arrest anchorage connector to an anchorage. Additionally the invention relates to a method of providing anchorages that can be pre-cast into concrete structures or attached with a variety of clamps or welding. Additionally this patent relates to anchorage connectors that can be installed and removed remotely and be self indicating if it has been improperly or insufficiently locked into its receiver. Additionally this connector can be used to connect horizontal lifelines to anchorages, install barriers, tie down loads in aircraft and ships and secure aircraft or water craft to docking ports.

2. Description of Related Art

Remote connect anchorage products are currently used in many applications for fall arrest, rescue, and evacuation situations. Connectors come in a variety of types such as those that are used to open and close locking snap hooks, those that are used to remotely attach to beams and those that connect to remotely attached D-rings. All of these remote connectors can work from extension poles for remotely connecting anchorages or remotely attaching to fallen or disabled workers for rescue. In each case the remote connect/disconnect tool is specifically designed to work with the specified anchorage connector. In each case, these remote connectors are made to work with previously installed anchorages, such as D-rings installed overhead or on harnesses, or beam flanges, etc. No system has previously been designed to enable remote connection to concrete structures. This invention relates to, but is not limited to, a method for remote fall protection anchorage connection to poured in place concrete structures.

Currently fall protection for workers doing poured in place concrete work is limited to attachment to Rebar or concrete forms. When Rebar is being erected workers typically tie off to the Rebar as it is being erected. When the concrete forms are installed over the Rebar the workers tie off to the concrete forms for fall protection. The problem occurs when the workers are removing the concrete forms. As the forms are removed from the top down, the tie off locations that were once above the worker disappear and the workers only choice is to tie off at his feet unless some other overhead structure exists. In case of a fall this situation creates a 12-ft. fee fall and introduces greater possibility of injury. OSHA requires that systems must be rigged so that a worker will encounter no more than 6 ft. of free fall. A system has been needed for some time that will solve this problem and enable workers and companies to come into compliance with OSHA requirement. This present invention relates to a method of embedding receivers in concrete form work with attachment to internal Rebar for added pullout strength so that as concrete forms are removed fall arrest anchorage receivers are exposed in the surface of the freshly poured concrete. This will allow the workers to always be attached overhead so that in case of a fall their free-fall is always limited to 6 ft. max. Another problem area for concrete work is perimeter fall protection of newly poured floors. OSHA requires that anyone within 6 ft. of the leading edge must have fall protection or there must be a perimeter guardrail. Some work such as glazing requires that the perimeter guardrail be removed. By installing the anchorage receivers in the forms 6-ft. in from the leading edges and on intervals of approximately 8 ft. in running length fall arrest attachment points can be installed in the ceiling to provide perimeter fall protection without the need for perimeter guardrails. This receiver can also be used on rooftops for window washers and in elevator shafts for repairmen. It is also designed for quick connect/disconnect of Horizontal Lifelines. Other uses can be for aircraft tie-downs, boat docks or other applications where high strength flush mounting of anchorages in concrete is required.

SUMMARY OF THE INVENTION

The present invention relates to an improved method of installing fall protection anchorage in poured in place concrete that will enable workers to remotely connect and disconnect from their anchorage location It provides for anchorages that can be flush mounted to walls, roofs, elevator shafts, runways, docks, and other locations that will enable a fall arrest attachment point to always be located above the worker even after forms and scaffolding have been removed. It provides for 5000-lbs. fall protection anchorages for personal fall arrest systems and for 12,000 lbs. Anchorages for horizontal lifelines. It allows for poured in place anchorage receivers as well as weld-on or clamp on receivers. The present invention allows for anchorage connections that are light weight, easy to connect and disconnect remotely and have 2 degrees of freedom, (they can both rotate and swivel) to reduce the possibility of rollout with locking and non-locking snap hooks.

The method comprises:

a. A pour in place anchorage receiver for concrete construction.

b. A weld on or clamp on anchorage receiver for steel erection or in plant use.

c. An anchorage connector that can be connected and disconnected remotely.

d. An anchorage connector that has 2 degrees of freedom to rotate and swivel.

e. An anchorage connector that can be locked into place or removed by a single pushing motion.

f. An anchorage connector that locks using a ball lock groove mechanism.

g. An anchorage connector that is self indicating and will push itself out of the receiver if a full lock is not achieved.

h. An anchorage connector that uses 2 or more rows of locking balls and different diameters so that each row of balls can lock only in its designated groove thus assuring that all balls must lock securely for the mechanism to be used.

i. An improved material and method for manufacturing surface finishing and heat treating the components.

j. A method for use allowing shock absorbing elements to be attached to the anchorage connector.

k. Special adapters to hold and position the anchorage receiver during installation in floors, ceilings and walls, etc.

In another aspect, this invention relates to the self indicating fail safe locking mechanism of the anchorage connector. By pushing in on the center pin of the connector, the ball lock is released and the balls are allowed to move toward the center of the connector thus allowing the connector to be inserted fully into the receiver. The outside diameter of the first row of balls is smaller than the inside diameter of the receiver entry. This assures that the first row of balls in the connector cannot lock into the first ball groove in the receiver. Therefore, for the connector to lock into the receiver each row of balls must be in its designated groove, thus assuring that all balls are sharing an equal load. Should the receiver be damaged and even one of the balls be unable to seat completely in the ball groove, that ball will keep the locking plunger from being able to move underneath any of the balls to lock them in place. In such a case the ejection spring on the end of the connector will push the connector out of the receiver showing that a problem has occurred, that the connector did not properly lock and that this particular receiver should not be used.

In another aspect the manufacturing materials and processes used to produce this product enable it to withstand the severe environment in which it must operate.

Extreme hardness of the surface is required due to its use in an abrasive concrete dust and rock environment. At the same time it must be extremely tough, but not brittle, so that it can withstand the shock loads imposed by fall arrest forces. To achieve this combination of toughness and extreme surface hardness a special process has been developed. The material chosen for the receiver is 17-4 PH stainless steel. It is machined in its annealed state at approximately 28 Rc hardness. Once machined it is polished and then coated with titanium nitride. The nitriding process required a 3 hour bake at 700 degrees F., which is the heat treat temperature of 17-4 ph stainless steel. The result of this process is that the 17-4 ph stainless steel is hardened to 40 Rc in its core (which is below the 42 Rc crossover range into brittleness) and yet it is 80 Rc on the surface which is the hardness of titaniun nitride. The result is the perfect combination of properties. The receiver is made of corrosion resistant stainless (to resist rust in a wet environment), hardened to 40 Rc in its core (which gives it the greatest strength without brittleness) and it is 80 Rc on the surface (which is harder than a file) to give it extreme wear resistance in the highly abrasive environment in which it must operate.

DESCRIPTION OF THE PREFERRED EMBODIMENTS

FIGS. 1 through 7 illustrate the quick connect/disconnect fall arrest anchorage receiver and connector geometry, use and assembly according to the preferred embodiment of this invention.

Figure 1:
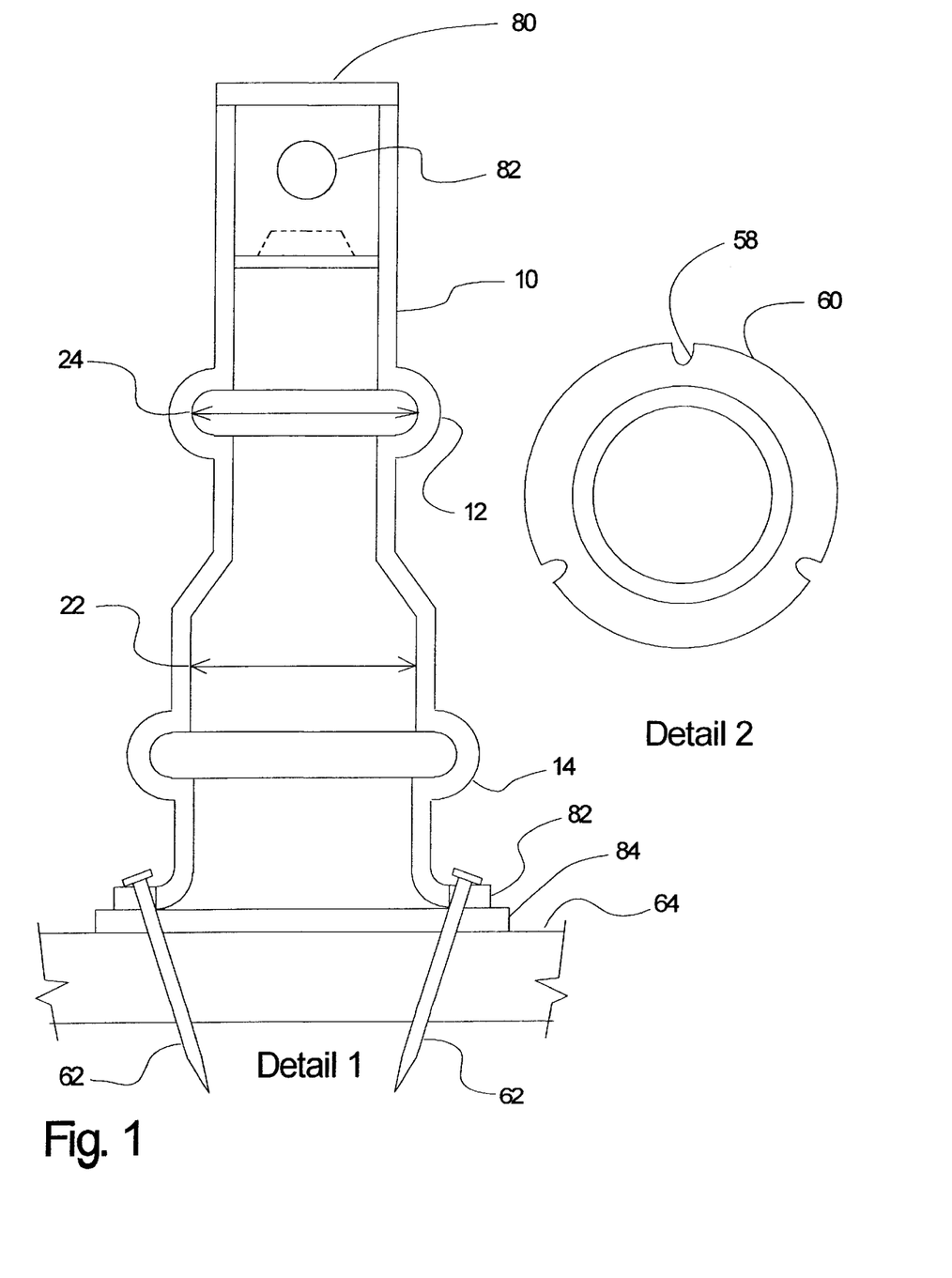
FIG. 1 is a detail of the concrete imbed receiver
Figure 2:
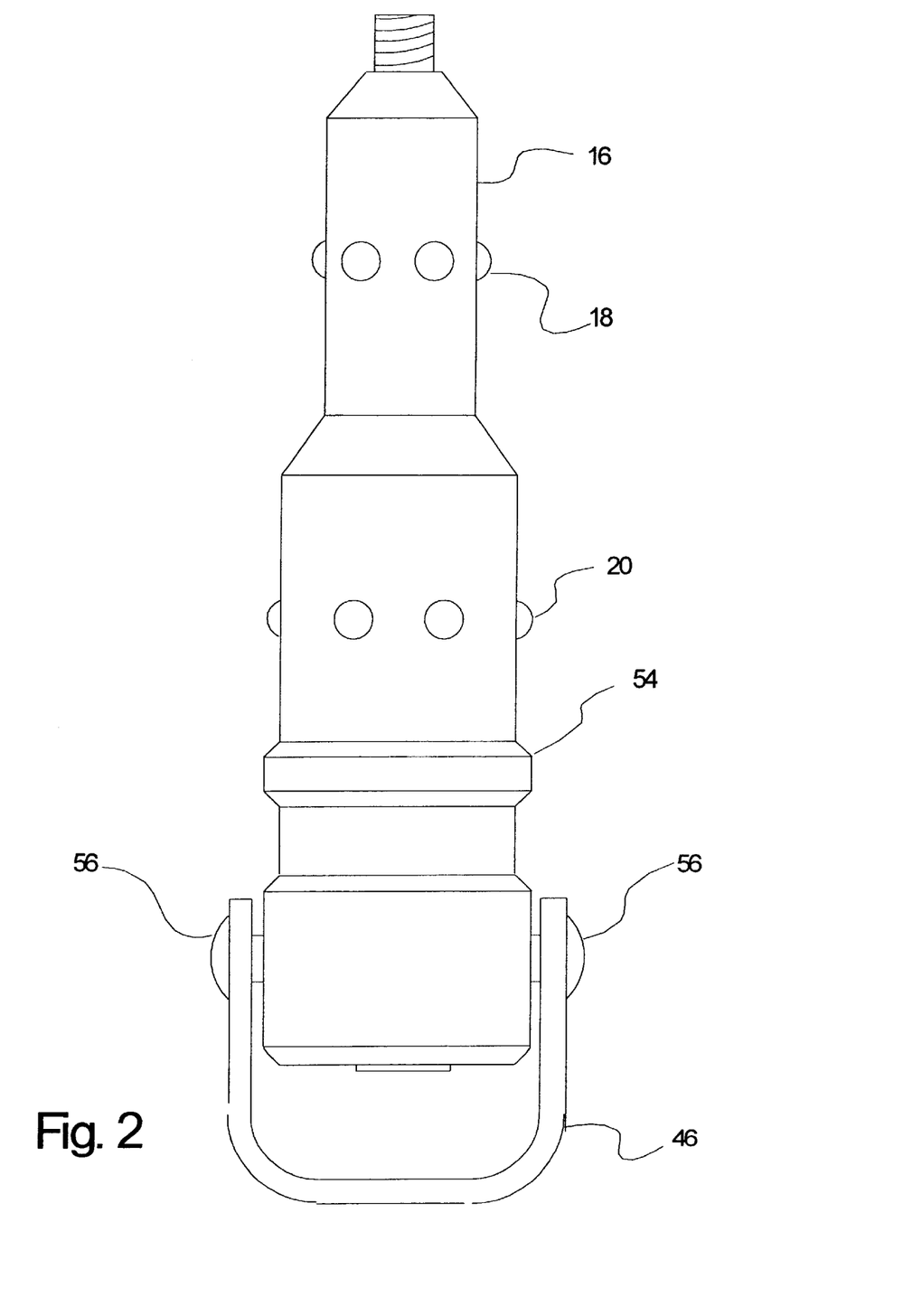
FIG. 2 is a connector detail
Figure 3:
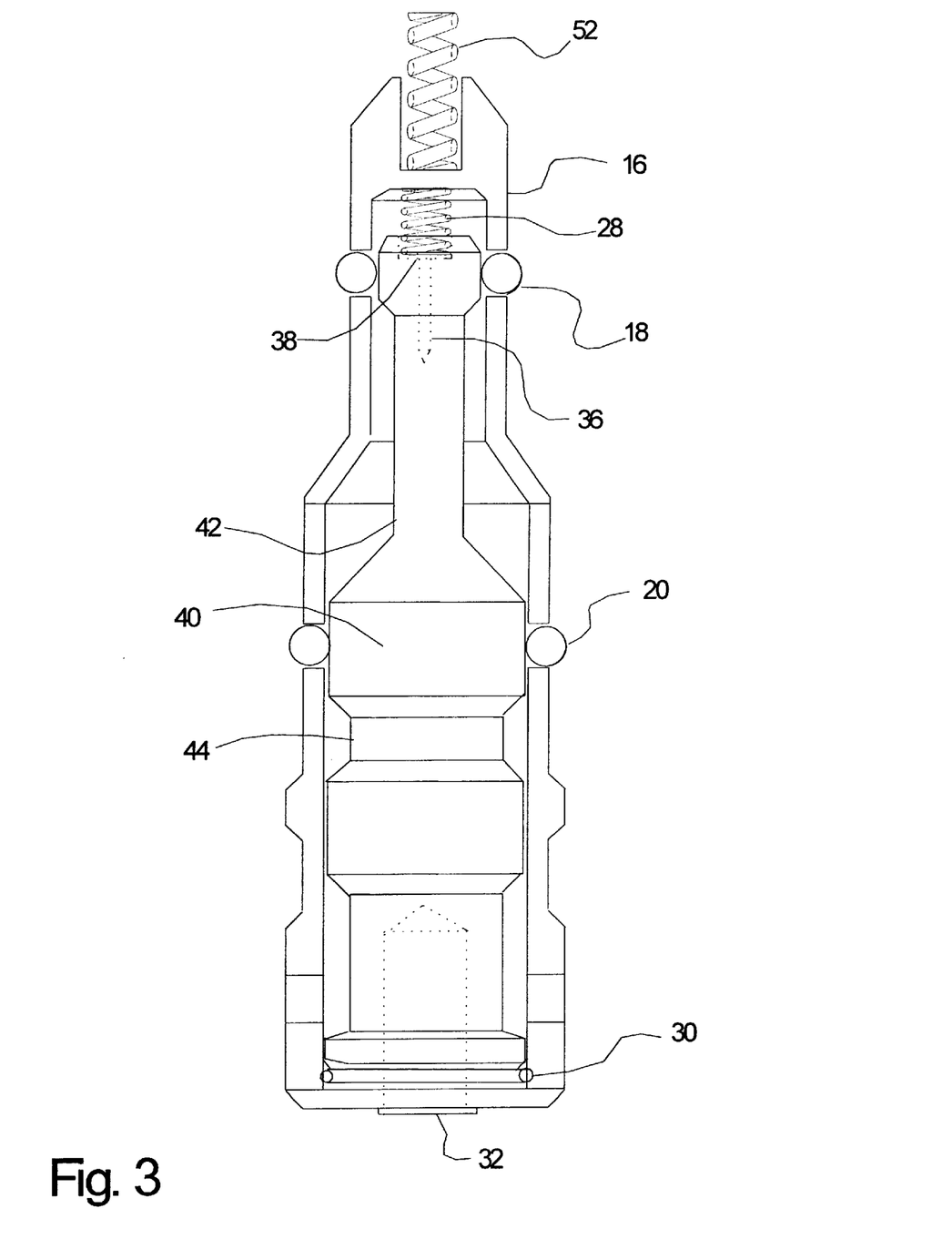
FIG. 3 is a connector sectional view
Figure 4:
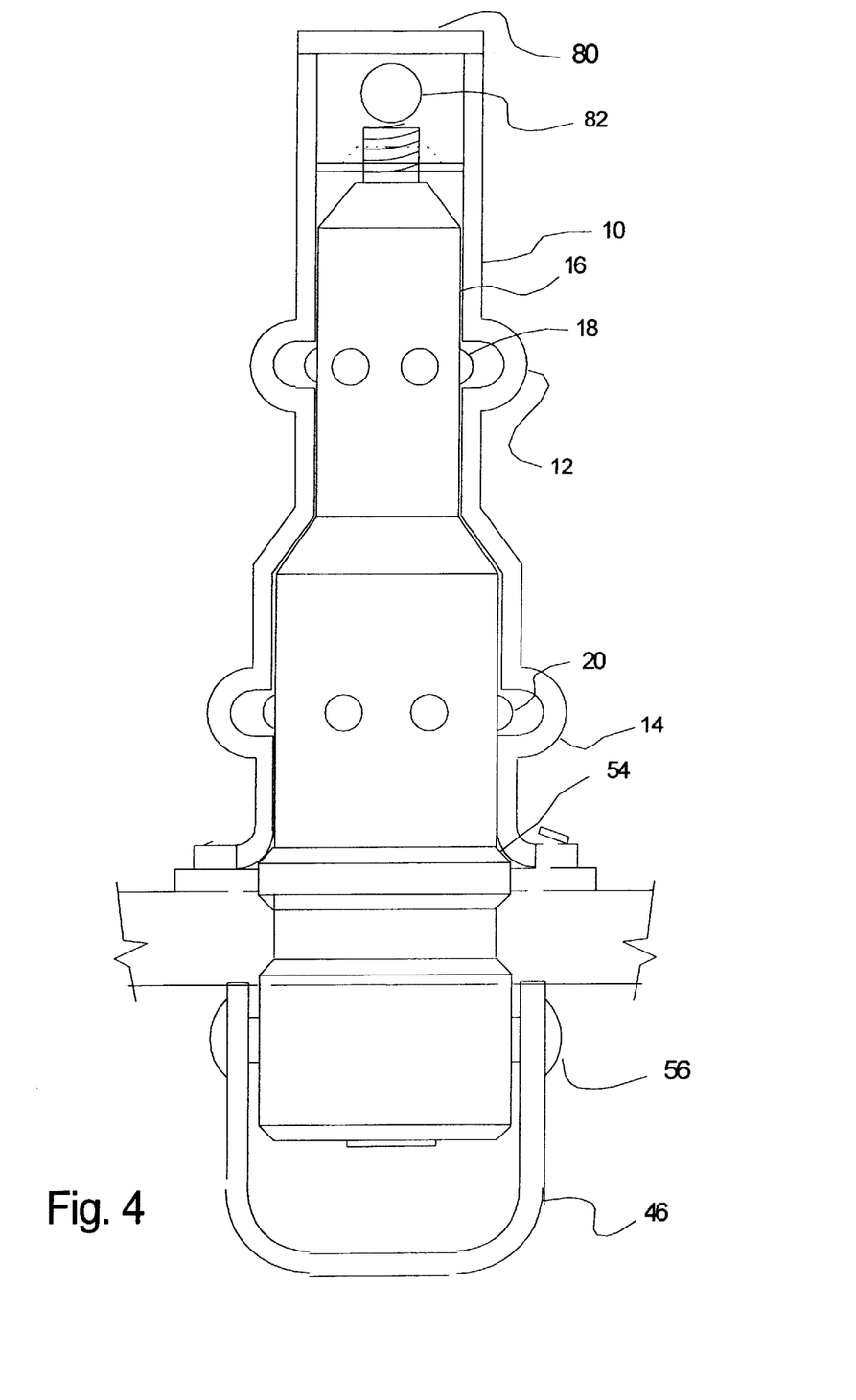
FIG. 4 is a view of the connector attached to the receiver
Figure 5:
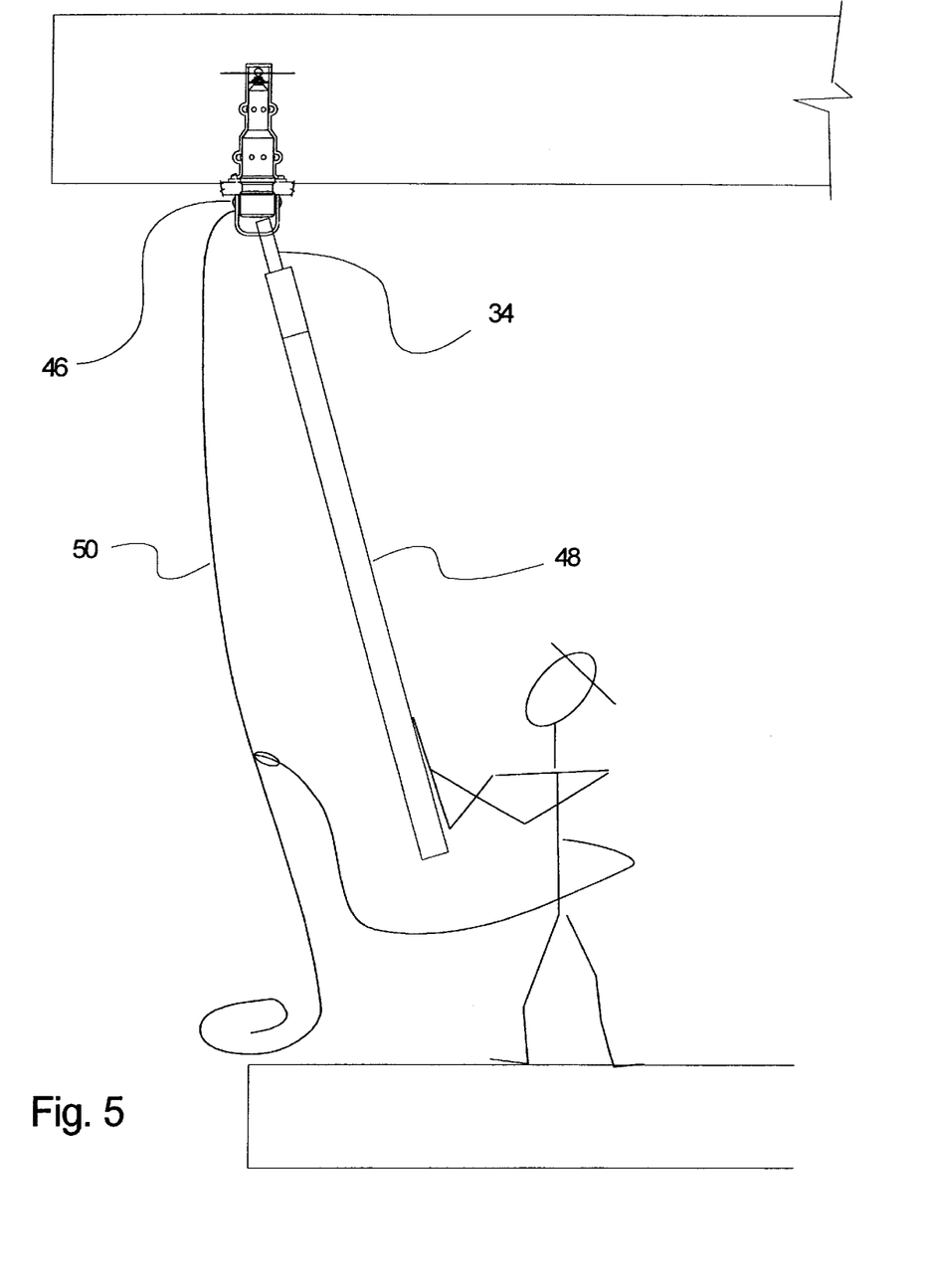
FIG. 5 is a detail of the remote connection/disconnection pole and use

Referring to FIG. 1, detail 1, the concrete imbed receiver 10 is shown in sectional view. The receiver is made of steel or stainless steel and is formed to contain at lease 2 or more separate ball grooves 12 and 14 in which the balls 18 and 20 in the receiver 16 lock when connected. The outside diameter of the ball groove 24 must be smaller than the inside diameter of the receiver at 22. This assures that when the connector 16 is inserted into the receiver 10 that the first row of balls 18 cannot lock into the first ball groove 14. This assures that the connector 16 must be inserted fully into the receiver 10 for any of the balls 18 & 20 to lock (see FIG. 4). This assures that all balls must share an equal load. In the preferred embodiment. There will be at least 6 balls in each row 18 and 20, but may be more or less. FIG. 3 is a sectional view showing the inner mechanism of the connector. The center of the connector body 16 contains a spring-loaded plunger 26 and a return pressure spring 28. The plunger 26 is retained in the connector body 16 by a retaining ring 30. The plunger 26 has a first hollow end 32 used to insert a screwdriver tip or remote pole tip 34 (FIG. 5). The plunger 26 also has a second hollow end 36 used to allow air pressure to be relieved as the plunger 26 moves forward in the connector body 16. As the plunger 26 moves forward in the connector body 16 its movement is resisted by the pressure spring 28. As the plunger 26 compresses the pressure spring 28 the retaining surfaces 38 and 40 which hold the balls 18 & 20 in their locked position move forward and allow the recess grooves 42 & 44 to move under the locking balls 18 & 20. This movement allows the balls to move inward into the connector 16 and release their lock against the ball grooves 12 & 14 in the receiver 10. By pulling on the load ring 46 while the plunger pressure spring 28 is compressed the connector can be removed from the receiver 16. This can be done remotely as shown in FIG. 5, by pushing up on the remote connect pole 48 and at the same time pulling down on the fall block or tag line rope 50 the connector 16 can be removed remotely. The connector 16 is installed remotely by inserting it on the top of the remote connect pole 48 and simply pushing. When the pushing force overcomes the force of the pressure spring 28 the connector 16 will snap into place in the receiver 10.

To enable the connector to be self-indicating if a lock has not been achieved, a second ejector spring 52 is installed in the end of the connector 16. The pressure spring 28 is stronger than the ejector spring 52. When the pressure spring 28 is compressed allowing the connector 16 to snap into place in the receiver 10 the force of the pressure spring 28 holds the ejector spring 52 in its compressed position. As the installation force used to compress the pressure spring 28 is release, this allows the plunger 26 to return to its locked position. If any damage has occurred to the receiver 10 (such as a damaged or plugged ball groove) that will not allow even one ball to move outward from the body of the receiver 16, the plunger 26 is unable to return to its locked position. The ejector spring 52 will then push the connector 16 out of the locking position (as shown in FIG. 4) thus making it impossible for the balls 18 & 20 to create a partial lock in the locking grooves 12 & 14. A slight pull then by the worker will remove the connector showing that it cannot be used for its intended purpose.

Since the connector 16 can be installed in receivers 10 that are positioned horizontally as well as vertically the tolerance between the connector and receiver must be liberal enough to allow the connector 16 to rotate freely in the receiver 10. After the balls 18 & 20 have locked securely in the ball grooves 12 & 14, the load ring 46 must also be able to rotate freely from side to side about the axis sleeves 56. This freedom of movement assures that a fall arrest load applied at right angles to the axis of the receiver can be controlled properly. This also reduces the possibility of rollout if used with non-locking snap-hooks. In a horizontally installed position the connector 16 is designed to rest against the receiver at a peripheral location 54 (FIG. 4). This removes the side load from the balls 20 and reduces the bending moments on the receiver 16.

Figure 8:
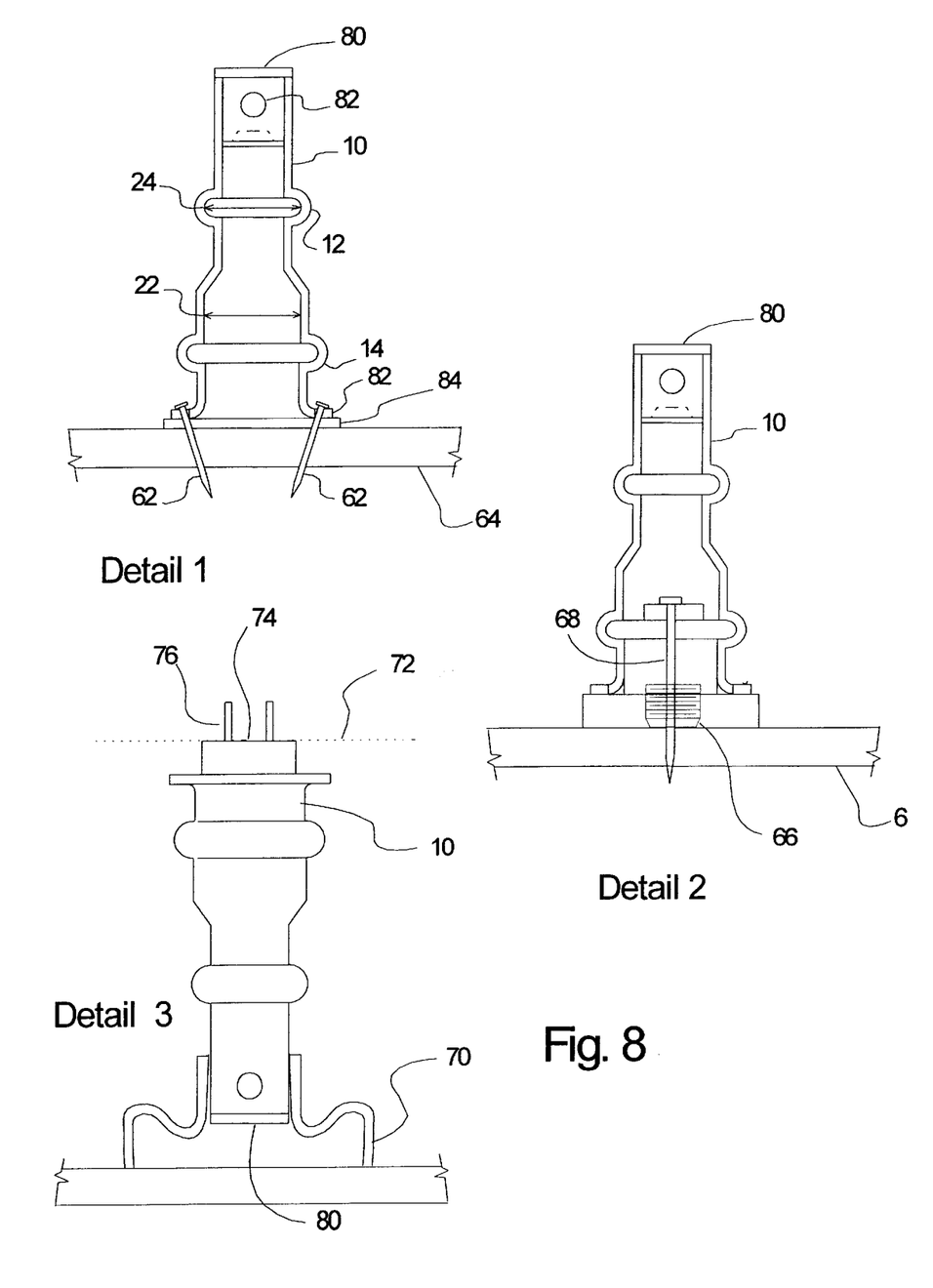
FIG. 8 shows mounting configurations

Mounting of the receivers 10 into concrete forms are accomplished by several means. FIG. 8 shows receivers mounted using nails to attach the receiver to a plywood form (Detail 1), mounting using a plastic mounting plug (Detail 2) and mounting using a wire suspension form (Detail 3). The receiver 10 has 3 notches 58 in the perimeter: of its base 60 that allow nails to be inserted through. Because these are notches 58, not holes, the nails 62 can be fully removed by bending them sideways after the concrete form 64 has been removed. Detail 2; FIG. 8 shows a receiver 10 that is snapped over a plastic-mounting plug 66. The plastic-mounting plug 66 can be installed with one center nail 68 by driving it through the center of the mounting plug 66. The mounting plug 66 then pops out when the form 14 is removed. Detail 3 shows a wire suspension form 70 used to support the receiver 10 when installing it in a form in which it will be exposed on the top surface of the concrete 72 such as for roof applications. In this position a pressure plug 74 is installed in the receiver 10 to keep concrete from entering the receiver during pouring of the concrete. Locating fingers 76 are part of the pressure plug 74 to enable the receiver to be located after the concrete is poured.

In normal installations a top pressure plug 80 is always installed in the top of the receiver 10 to keep concrete out of the receiver. A bottom pressure washer 82 with sealing foam 84 is used to prevent concrete from entering the bottom of the receiver during installation. The pressure of the installation nails 62 assures a tight fit against the concrete form 64.

Figure 6:
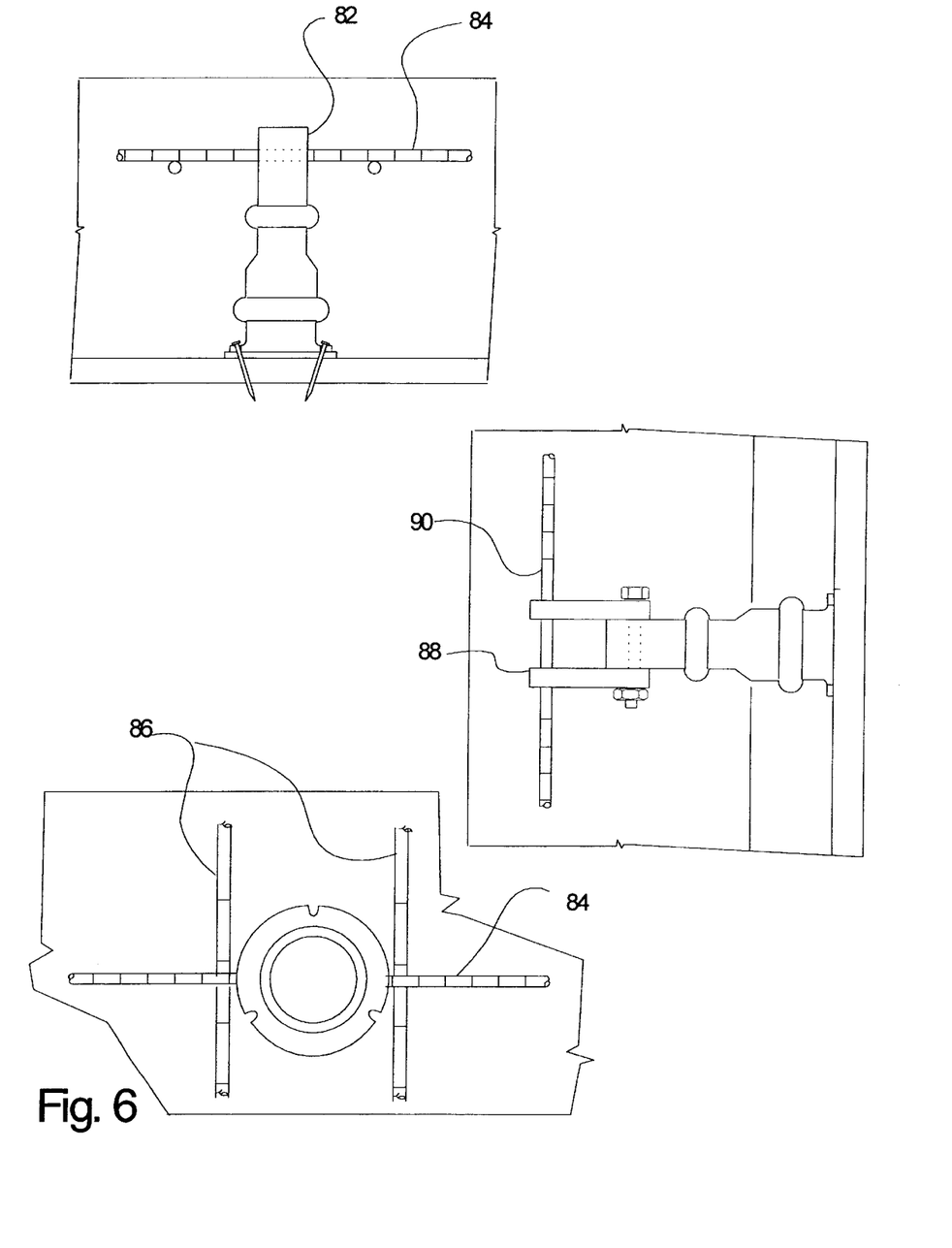
FIG. 6 is a detail of imbed receivers in concrete showing rebar connections
Figure 7:
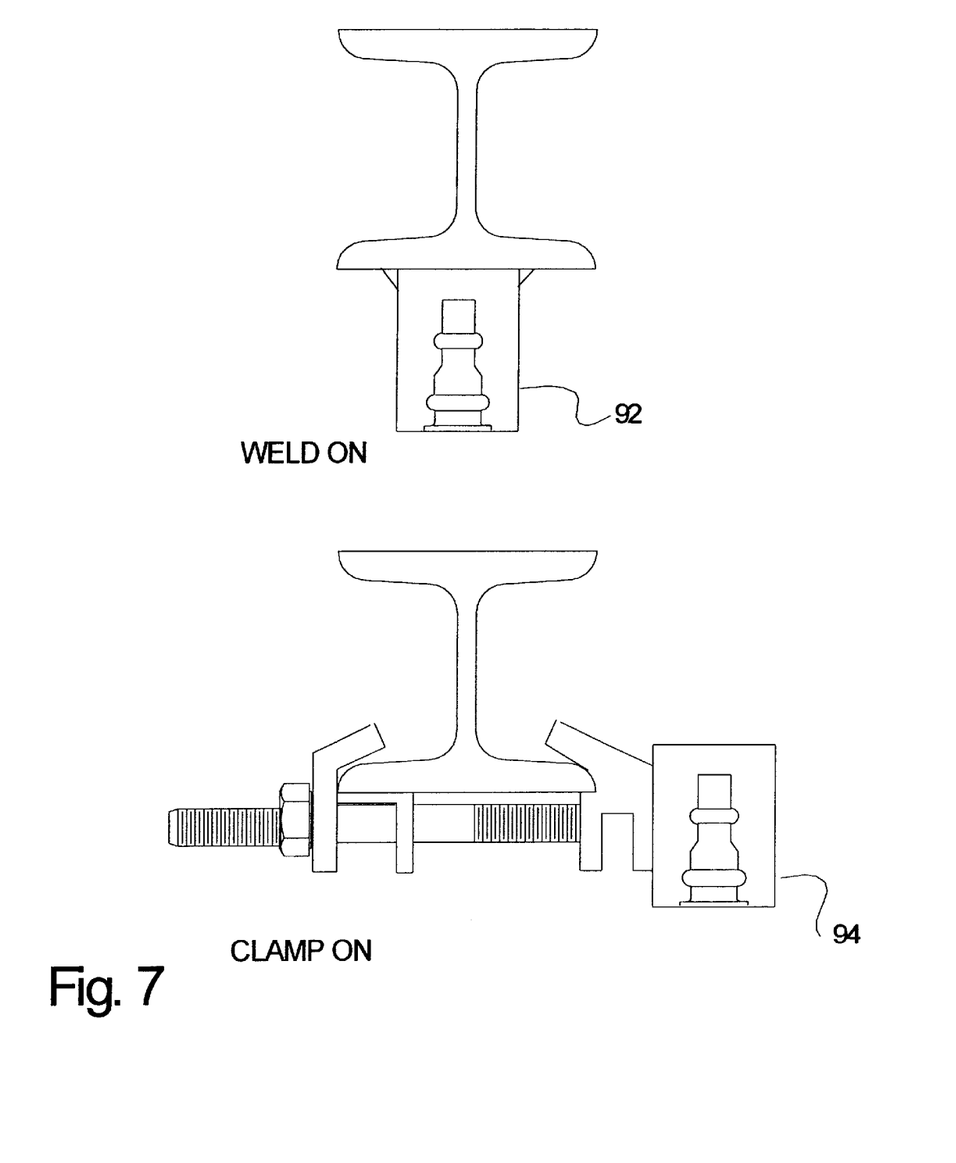
FIG. 7 is a detail showing receivers attached to rigid structure other than concrete

The receiver 10 is produced with a cross hole 82 in the top of the receiver 10 which is used to insert a section of rebar 84 as shown in FIG. 6. Cross rebar 86 may also be added for additional support In some cases special brackets 88 may be added to enable, support to be made to larger rebar 90 or to rebar embedded deeper into the concrete. The design of the receiver though is not limited to pour in place concrete applications. FIG. 7 shows a weld on receiver 92 and a clamp on receiver 94, of which there is an infinite variety and styles.

What is claimed is:

1. A fall arrest anchorage device for use with a female retaining receiver having an aperture along a receiver axis, the female retaining receiver further having a first groove bounded by the aperture and a second groove bounded by the aperture, the anchorage device comprising:

An elongated male connector having a first end and a second end that extend along a connector axis, and a first section of a first cross-sectional area and a second section of a second cross-sectional area, the first cross-sectional area being larger than the second cross-sectional area, and the first section being closer to the first end than the second section, the male connector further having at least one of a first retractable protrusion on the first section and at least one of a second retractable protrusion on the second section, the first retractable protrusion being positioned along the male portion such that the first retractable protrusion will cooperate with the first groove in the receiver when the second retractable protrusion engages the second groove.

2. A fall arrest anchorage device according to claim 1 wherein said first retractable protrusion is selectively retractable, and said second retractable protrusion is selectively retractable.

3. A fall arrest anchorage device according to claim 1 wherein said first end and said second end of said elongated male connector are generally cylindrical.

4. A fall arrest anchorage device according to claim 1 wherein said first retractable protrusion includes a spring loaded bearing, and said second retractable protrusion includes a spring loaded bearing.

5. A fall arrest anchorage device for use with a female retaining receiver having an aperture along a receiver axis, the female retaining receiver further having a first groove bounded by the aperture and a second groove bounded by the aperture, the anchorage device comprising:

An elongated, generally cylindrical male connector having a first end and a second end that extend along a connector axis, and a first section of a first cross-sectional area and a second section of a second cross-sectional area, the first cross-sectional area being larger than the second cross-sectional area, and the first section being closer to the first end than the second section, the male connector further having at least one of a first selectively retractable protrusion for projecting from the first section and at least one of a second selectively retractable protrusion for projecting from on the second section, the first retractable protrusion being positioned along the male portion such that the first retractable protrusion will cooperate with the first groove in the receiver when the second retractable protrusion engages the second groove.

6. A method for creating a fall arrest anchorage device for use with a female retaining receiver having an aperture along a receiver axis, the female retaining receiver further having a first groove bounded by the aperture and a second groove bounded by the aperture, the method comprising:

providing an elongated male connector having a first end and a second end that extend along a connector axis, and a first section of a first cross-sectional area and a second section of a second cross-sectional area, the first cross-sectional area being larger than the second cross-sectional area, and the first section being closer to the first end than the second section;

providing at least one of a first retractable protrusion on the first section of the male connector;

providing at least one of a second retractable protrusion on the second section; and positioning the first retractable protrusion along the male portion such that the first retractable protrusion will cooperate with the first groove in the receiver when the second retractable protrusion engages the second groove.

7. A method according to claim 6 wherein said first retractable protrusion is selectively retractable, and said second retractable protrusion is selectively retractable.

* * * * *